(12) United States Patent
Heo et al.

(10) Patent No.: US 9,225,449 B2
(45) Date of Patent: Dec. 29, 2015

(54) PERFORMING A HANDOVER IN A HETEROGENEOUS WIRELESS NETWORK

(71) Applicant: INTEL CORPORATION, Santa Clara, CA (US)

(72) Inventors: Youn Hyoung Heo, Seoul (KR); Mo-Han Fong, Sunnyvale, CA (US); Yujian Zhang, Beijing (CN); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 49 days.

(21) Appl. No.: 13/756,665

(22) Filed: Feb. 1, 2013

(65) Prior Publication Data

US 2013/0301439 A1 Nov. 14, 2013

Related U.S. Application Data

(60) Provisional application No. 61/646,223, filed on May 11, 2012.

(51) Int. Cl.
*H04J 3/26* (2006.01)
*H04B 7/26* (2006.01)
(Continued)

(52) U.S. Cl.
CPC ... *H04J 3/26* (2013.01); *H04B 1/56* (2013.01); *H04B 7/024* (2013.01); *H04B 7/0456* (2013.01); *H04B 7/0473* (2013.01); *H04B 7/0486* (2013.01); *H04B 7/063* (2013.01); *H04B 7/065* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/1694* (2013.01); *H04L 27/2627* (2013.01);
(Continued)

(58) Field of Classification Search
USPC ......... 370/331, 338, 328, 332, 329, 252, 310; 455/439, 436, 437, 442
See application file for complete search history.

(56) References Cited

U.S. PATENT DOCUMENTS

2010/0329211 A1* 12/2010 Ou ................................ 370/331
2011/0019641 A1* 1/2011 Chang et al. ................. 370/331
(Continued)

FOREIGN PATENT DOCUMENTS

WO 2013/170209 A1 11/2013

OTHER PUBLICATIONS

International Search Report and Written Opinion received for PCT Patent Application No. PCT/US2013/040644 mailed on Jul. 1, 2013, 10 pages.

(Continued)

*Primary Examiner* — Habte Mered
*Assistant Examiner* — Rownak Islam
(74) *Attorney, Agent, or Firm* — Thorpe North & Western (57) ABSTRACT

Technology for performing a handover in a heterogeneous wireless network (HetNet) is disclosed. One method comprises receiving, at an anchor serving cell in the HetNet, channel measurement reports made by a user equipment (UE) for a plurality of cells. A transmission point change request can be sent, based on the channel measurements for the UE, from the anchor serving cell to a target transmission point. The target transmission point is located in one of the plurality of cells. A transmission point change indicator is sent from the anchor cell to the UE to indicate a change in TP with which the UE will communicate via an air interface, while maintaining a connection to the anchor serving cell.

24 Claims, 8 Drawing Sheets

(51) Int. Cl.
| | |
|---|---|
| H04W 36/00 | (2009.01) |
| H04J 3/16 | (2006.01) |
| H04W 24/10 | (2009.01) |
| H04W 72/04 | (2009.01) |
| H04W 72/08 | (2009.01) |
| H04J 3/00 | (2006.01) |
| H04B 1/56 | (2006.01) |
| H04W 56/00 | (2009.01) |
| H04W 52/02 | (2009.01) |
| H04W 76/02 | (2009.01) |
| H04W 4/22 | (2009.01) |
| H04W 36/22 | (2009.01) |
| H04B 15/00 | (2006.01) |
| H04W 76/04 | (2009.01) |
| H04B 7/02 | (2006.01) |
| H04B 7/04 | (2006.01) |
| H04B 7/06 | (2006.01) |
| H04W 24/02 | (2009.01) |
| H04W 72/12 | (2009.01) |
| H04L 29/02 | (2006.01) |
| H04W 4/00 | (2009.01) |
| H04W 4/06 | (2009.01) |
| H04W 48/20 | (2009.01) |
| H04L 29/06 | (2006.01) |
| H04W 4/02 | (2009.01) |
| H04L 27/26 | (2006.01) |
| H04W 72/10 | (2009.01) |
| H04W 36/30 | (2009.01) |
| H04W 36/18 | (2009.01) |
| H04W 88/06 | (2009.01) |
| H04W 72/02 | (2009.01) |
| H04W 16/14 | (2009.01) |

(52) U.S. Cl.
CPC .............. *H04L 29/02* (2013.01); *H04L 69/22* (2013.01); *H04W 4/005* (2013.01); *H04W 4/023* (2013.01); *H04W 4/06* (2013.01); *H04W 4/22* (2013.01); *H04W 24/02* (2013.01); *H04W 24/10* (2013.01); *H04W 36/00* (2013.01); *H04W 36/0061* (2013.01); *H04W 36/22* (2013.01); *H04W 48/20* (2013.01); *H04W 52/0212* (2013.01); *H04W 52/0225* (2013.01); *H04W 52/0235* (2013.01); *H04W 56/00* (2013.01); *H04W 72/042* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/1215* (2013.01); *H04W 76/023* (2013.01); *H04W 76/027* (2013.01); *H04W 76/048* (2013.01); *H04W 16/14* (2013.01); *H04W 36/18* (2013.01); *H04W 36/30* (2013.01); *H04W 72/02* (2013.01); *H04W 88/06* (2013.01); *Y02B 60/50* (2013.01)

(56) References Cited

U.S. PATENT DOCUMENTS

| | | | |
|---|---|---|---|
| 2011/0183676 A1* | 7/2011 | Lee et al. | 455/438 |
| 2012/0282964 A1* | 11/2012 | Xiao et al. | 455/515 |
| 2012/0327797 A1* | 12/2012 | Siomina et al. | 370/252 |
| 2013/0003695 A1* | 1/2013 | Nylander et al. | 370/331 |
| 2013/0028182 A1* | 1/2013 | Geirhofer et al. | 370/328 |
| 2013/0039338 A1* | 2/2013 | Suzuki et al. | 370/331 |
| 2013/0040675 A1* | 2/2013 | Ant et al. | 455/509 |
| 2013/0064226 A1* | 3/2013 | Dinan | 370/332 |

OTHER PUBLICATIONS

Enrique, Stevents Navarro, "A Vertical Handoff Decision Algorithm in Heterogeneous Wireless Networks" Second UBC-IEEE Workshop on Future Wireless Systems Mar. 9, 2007, 12 pages.

Nidal, Nasser, "IEEE Communications Magazine", Oct. 2006.

* cited by examiner

PERFORMING A HANDOVER IN A HETEROGENEOUS WIRELESS NETWORK

RELATED APPLICATIONS

This application claims the benefit of and hereby incorporates by reference U.S. Provisional Patent Application Ser. No. 61/646,223, filed May. 11, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) Rel. 8, 9 and 10, the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11-2012 standard, which is commonly known to industry groups as WiFi.

In a 3GPP radio access network (RAN) LTE system, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes within a macro node's geographic coverage area (i.e. cell) and at the boundaries between the macro nodes' coverage areas. Low power nodes can also be used to improve capacity in high use areas and improve indoor coverage where building structures impede signal transmission.

Homogeneous networks or HetNets can use time-division duplexing (TDD) or frequency-division duplexing (FDD) for DL or UL transmissions. Time-division duplexing (TDD) is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission can operate using different frequency carriers. In FDD, interference can be avoided because the downlink signals use a different frequency carrier from the uplink signals.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the terms "node" and "cell" are both intended to be synonymous and refer to a wireless transmission point operable to communicate with multiple user equipment, such as an eNodeB or a low power node.

Other terms may be defined elsewhere in the body of this specification.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Figure 1:
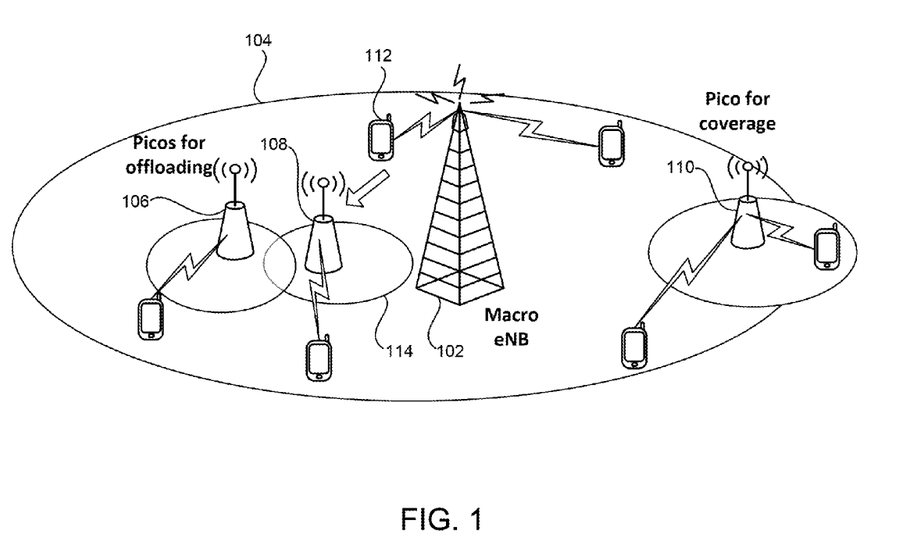
FIG. 1 illustrates a block diagram of a heterogeneous wireless network.

A potentially large number of low power nodes, such as pico nodes may exist within the geographic region covered by a macro eNB. For example, FIG. 1 illustrates a macro eNB 102 that provides coverage area 104. Within this coverage area are two pico cells 106, 108 which can be used to improve capacity in high use areas by allowing the macro eNB to offload to the pico cells 106, 108. Another pico cell 110 is illustrated as existing on the edge of the coverage area 104. The pico cell 110 can be used to fill coverage holes within the macro node's coverage area 104 and at the boundaries between the macro nodes' coverage area, as shown in FIG. 1.

While three pico nodes 106, 108, 110 are illustrated within the coverage area of the macro node 102, a macro node's coverage area may include hundreds or even thousands of pico nodes. For example, pico nodes configured as HeNBs may be located in hundreds or thousands of homes that are within the coverage area of a single macro node.

Frequent handover can occur if a user equipment (UE) is moving around relative to a large number of low power nodes located within the macro node's coverage area. Frequent handover is typically not desirable since the handover process, as outlined in the 3GPP LTE specifications Rel. 8, 9 and 10 entails a fairly large number of overhead messages, such as radio resource control (RRC) signaling messages that are communicated between the UE and the wireless network. In addition, handover can also entail additional overhead, including physical layer reconfiguration and uplink synchronization with random access when a UE enters the coverage area of a new node, such as an LPN.

Figure 2:
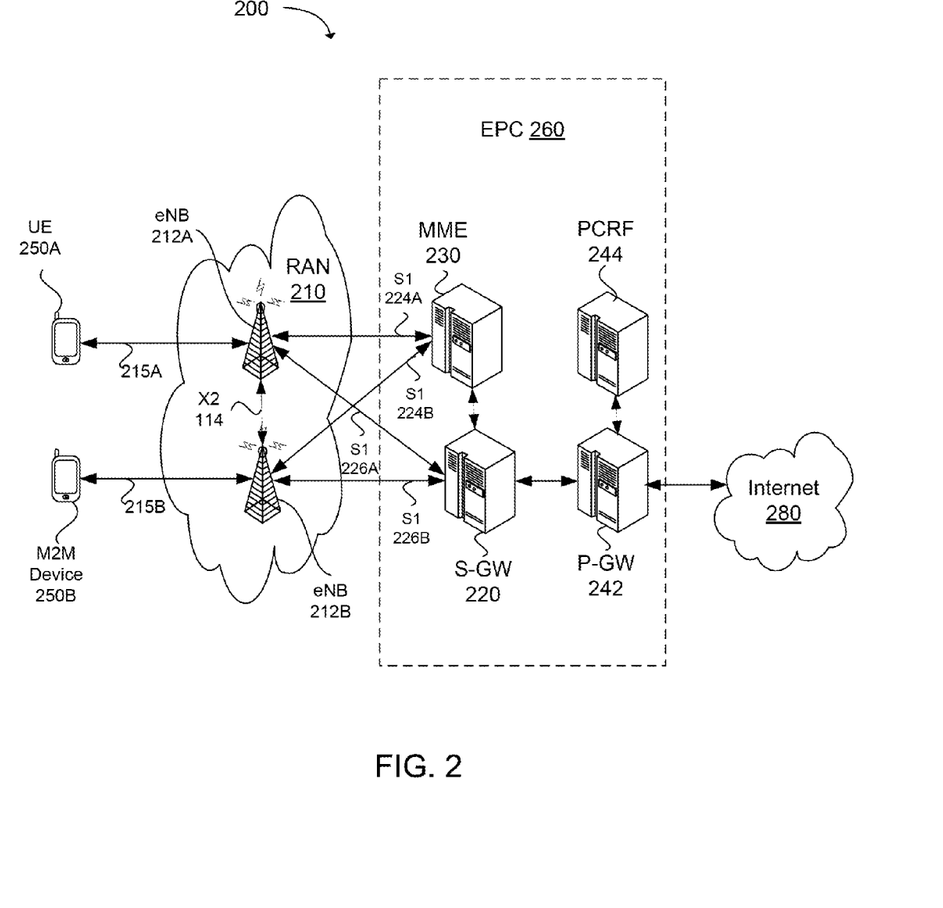
FIG. 2 illustrates a block diagram of third generation partnership project (3GPP) wireless network.

A brief review of a wireless network is provided for clarity. FIG. 2 illustrates an example of a 3GPP LTE radio access network (RAN) system. The system operates based on the 3GPP LTE specification, such as releases 8, 9 10, and 11. The wireless network 200 illustrated in FIG. 2 is comprised of a RAN 210 and an evolved packet core (EPC) 260. For 3GPP LTE, the RAN 210 illustrated in FIG. 2 can include transmission nodes such as the evolved universal terrestrial radio access (E-UTRAN or eUTRAN) or UTRAN modules, represented as the eNodeBs 212A and 212B. The eNodeBs can include both a macro node and a plurality of low power nodes, as previously discussed.

The RAN 210 can be in communication with an evolved packet core (EPC) 260. The EPC can include a serving gateway (S-GW) 220 and a mobility management entity (MME) 230. The EPC can also include a packet data network (PDN) gateway (P-GW) 242 to couple the S-GW to a PDN, such as the Internet 280, an intra-net, or other similar network. The S-GW can provide internet network access and standard network access for the mobile devices associated with the RAN. The S-GW and MME can be in direct communication with each other via cabling, wire, optical fiber, and/or transmission hardware, such a router or repeater.

The eNodeBs 212A-B can be connected to one or more UEs, such as UEs 250A-B via an LTE radio link 215 A-B, respectively. A backhaul link 214, such as an X2 link, can be used to connect the eNBs. The X2 link is typically formed over a broadband wired or optical connection between the eNBs. Connections between the eNBs 212A-B, the S-GW 220, and the MME 230 can be made via S1 type connections 224A-B, and 226A-B. The S1 interface is described in 3GPP Technical Specification (TS) 36.410 versions 8 (2008, Dec. 11), 9 (2009, Dec. 10) and 10 (2011-03-23), which are available to the public.

The EPC 260 can also include a policy and charging rules function (PCRF) node 244 that can be used to determine, in near real time, policy rules in the wireless network. The PCRF node can access subscriber databases and other specialized functions, such as charging systems, as can be appreciated.

In accordance with one embodiment of the present invention, in order to avoid frequent handover procedures in a HetNet deployment scenario, as illustrated in FIG. 1, a new handover procedure is disclosed. In the new handover procedure, a UE may maintain a connection with a macro eNB while moving between LPNs within the macro node's coverage area. Each LPN can be referred to as a transmission point/reception point. As a UE moves from one transmission point/reception point (i.e. an eNB such as an LPN) to another transmission point/reception point, the UE can maintain radio resources that are configured at the UE side with the macro node. This allows the UE to move from macro cell to pico cell or vice versa without tearing down and rebuilding radio resources, such as a radio resource control (RRC) connection with the macro node.

In one embodiment, the macro node 102 and pico cell 106, 108 may be within wireless communication range, such as a pico cell used for offloading. Alternatively, the pico cell 110 may be outside the range of the macro node, such as a pico cell used to provide additional coverage. Whether the pico cell is inside or outside the wireless communication range of the macro node, the pico cell and macro node may be connected via a wired or optical connection to form an X2 interface. In addition, when the pico cell is within the wireless communication range of the macro node, the pico cell and macro node may communicate via an air interface, as can be appreciated.

When a UE 112 moves from the coverage area 104 of a macro node 102 into the coverage area 114 of a pico cell 108, the UE may not be able to receive a downlink signal from the macro node due to interference from a downlink signal from the pico cell. In order for a UE to maintain a connection with a wireless network, the UE is typically configured to be handed over from the macro node to the pico cell. This process is referred to as handover (HO).

During handover, most of the physical channels are reconfigured because physical channels are typically defined relative to the node to which they are connected (i.e. macro node or LPN). Each node can also be referred to as a cell. The relationship of the physical channels with respect to the cell is referred to as being defined in a cell specific manner, based on a physical cell ID of the cell.

For example, the scrambling sequence for a UE can be initialized based on physical cell ID. When the UE communicates with a macro cell, the physical channels are scrambled by the cell ID of the macro cell. When the UE communicates with a pico cell, the physical channels are configured to be scrambled by a cell ID of the pico cell. To overcome this limitation, cell specific parameters can be replaced with UE specific parameters. UE specific parameters can include a channel state information reference signal (CSI-RS) and a demodulation reference signal (DMRS).

For instance, the scrambling sequence of a CSI-RS or a DMRS of a Physical Downlink Shared Channel (PDSCH) or an Enhanced Physical Downlink Control Channel (E-PD-CCH) can be initialized with an RRC configured parameter instead of a cell ID of a specific node or cell. To derive a base sequence and cyclic shift hopping initialization for a Physical Uplink Shared Channel (PUSCH), a Physical Uplink Control Channel (PUCCH) or Sounding Reference Signal (SRS), an RRC configured UE specific parameter can be used instead of a physical cell ID of a specific node. For example, a virtual cell identity can be configured for the PUSCH, PUCCH or SRS. The same virtual cell identity can be applied for all uplink channels or a different virtual cell identity can be applied for each channel. Furthermore, for the cyclic shift hopping initialization, a dedicated cyclic shift hopping identity can be signaled and can be used instead of a physical cell identity.

Once all physical channels are not tied to a cell specific parameter, the UE does not need to perform radio resource reconfiguration when a handover occurs, even when the transmission point has changed from one cell to another cell. The UE can continue to use the radio resource configured by the macro cell. In other words, the UE can continue to transmit and receive signals via downlink and uplink channels configured by the macro cell.

If a cell-specific reference signal (CRS) to resource element (RE) mapping is different between a macro cell and a pico cell, the simple indication of a transmission point (TP) change may be used to inform the UE of the change. A transmission point is a cell configured to transmit a signal. Similarly, a reception point (RP) is a cell configured to receive a signal. The TP and RP are typically in the same cell. However, it is possible for the TP and RP to be located in different cells. In this case, the UE may need to know that a change in transmission point has occurred to apply a rate matching of PDSCH data around CRS resource elements (REs). Otherwise, a change in TP can be transparent to the UE.

For example, from the UE's perspective, the current serving macro node with which the UE is in communication, referred to herein as the anchor serving cell, can continue to be the serving cell regardless of a change in TP. In one embodiment, the anchor serving cell of the UE does not change even when the UE moves out of the coverage area of the anchor serving cell.

Figure 3:
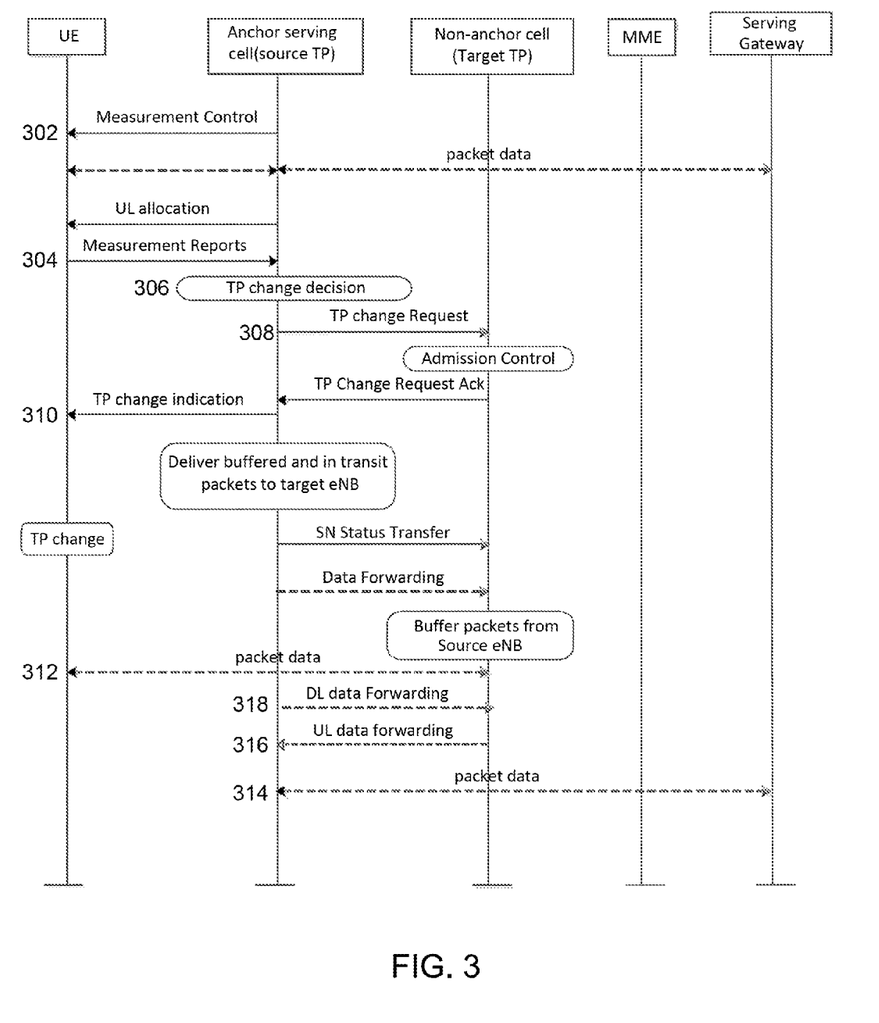
FIG. 3 illustrates a flow diagram of a change in transmission point for a user equipment (UE) in accordance with an example.

FIG. 3 provides one example illustration of information communicated within a HetNet to implement a TP change from an anchor serving cell to a non-anchor cell. The following steps may be performed to implement the TP change.
Measurement Control In accordance with one embodiment, an anchor serving cell, such as a macro cell, can be configured to determine whether a TP change is needed based on one or a combination of measurement reporting. The anchor serving cell can indicate to the UE the type of measurements are desired and send a measurement control message 302 to a UE. In this period, the UE can still communicate packet data to the anchor serving cell. The anchor serving cell can then forward the packet data to the serving gateway, as illustrated in FIG. 3.

One measurement can include a CRS based Radio Resource Management (RRM) measurement, which can be performed as described in the 3GPP LTE Rel. 8 specification describing RRM measurements. The anchor serving cell can configure the UE to measure neighboring cells, including a target cell. A target cell, as used herein, is a macro node or LPN associated with a coverage area in which the UE is located in or is moving towards. As the UE moves towards the target cell, power based measurements will increase, while power based measurements made by the UE with respect to the anchor serving cell will decrease, as occurs in a typical handover.

A CSI-RS based RRM measurement can also be performed. For example, the UE can measure CSI-RS transmitted from each TP. In this case, a new set of cells can be defined in order to let the UE know which CSI-RS or CSI-RS of which neighboring cell should be measured. Another measurement that can be performed includes CSI feedback in a physical uplink control channel (PUCCH). The source cell, such as the anchor serving cell, can configure the UE to send CSI feedback of a set of CSI-RS ports that are transmitted from the target cell or a set of neighbor cells. The CSI feedback can be UE specific instead of cell specific.
Measurement Reporting The UE can then send one or more measurement reports 304 to the anchor serving cell after the UE is scheduled with an UL allocation. The report of the measurements may be communicated at a predetermined frequency, communicated when a trigger is received from the serving cell, or communicated when a reporting condition is met.
TP Change Decision As the UE enters the coverage area of a non-anchor cell, referred to as a target TP, a TP change decision can be implemented by the anchor serving cell. The anchor serving cell can transmit a TP change request 308 to the target TP. In this request, the anchor serving cell passes selected information to prepare for a TP change at the target TP. The selected information can include a UE specific identity used for physical channels. If the UE radio resource information for physical channels is already shared by possible cells for a TP change only the TP change indication may be transmitted to the target TP. The anchor serving cell can determine the possible cells of the TP change when it determines possible cells for CSI-RS RRM measurement. A TP change request acknowledgement can then be sent from the target TP to the anchor serving cell.
TP Change Indication After a TP change request acknowledgement message is received by the anchor serving cell, a TP change indication message 310 can be sent from the anchor serving cell to the UE. In one embodiment, the TP change indication message can be communicated to the UE via at least one of Downlink Control Information (DCI), Medium Access Control (MAC) Control Element (CE) or RRC signaling.

When DCI is used to communicate the TP change indication message from the anchor serving cell to the UE, the presence of a TP indicator can be configured by RRC signaling to include the TP indicator only when it is required. In this case, either the anchor serving cell (i.e. source TP) or target TP can send TP or reception point (RP) change indicator depending on when the TP change is applied. For example, if the TP is changed from the subframe when the indicator is received, the TP change indicator is transmitted from the target TP. If the TP is changed after the TP change indicator is received, the TP change indicator could be transmitted from the source TP.

When RRC signaling is used to communicate the TP change indication message from the anchor serving cell to the UE, the TP change indication message can comprise an RRC connection reconfiguration message with a TP change indicator, which can be signaled using RRC signaling. Since the exact activation time of reconfiguration with RRC signaling is not defined, the timing of changing of a TP may be different depending on a UE RRC processing time. In one embodiment, the UE RRC processing time can be taken into account when determining when to schedule a packet data transmission for the RRC connection reconfiguration message with the TP change indicator. The eNB can send the TP change indication message X subframes before TP is changed, where X subframes is defined considering the UE RRC processing time and other factors e.g. HARQ processing time.

When a medium access control (MAC) control element (CE) is used to communicate the TP change indication message from the anchor serving cell to the UE, a TP change indicator can be included in a MAC CE. In one embodiment, a new MAC CE can be defined with a new Logical Channel IDentity (LCID). Alternatively, an activation/deactivation MAC CE can be reused if it is not used for carrier aggregation.

After the TP has been changed, packet data transmission 312 and reception 314 can occur between the UE and the target TP. In uplink communication, the target TP can forward 316 the received packet to the anchor serving cell, which delivers the received packet to the serving gateway (S-GW). In downlink communication, the anchor serving cell delivers buffered packets to the target TP and the target TP buffers packets from the anchor serving cell until the UE is prepared to receive the signal from the target TP. If the UE is ready to receive the signal from the target TP, the target TP transmits it to the UE via an air interface.

UE Updates

After the TP has been changed, the UE may need to perform updates with respect to PDSCH decoding, uplink synchronization, radio link monitoring and uplink power control, downlink synchronization, and the MIB/SIB. The updates that may need to be performed will be discussed more fully in the proceeding paragraphs.

The UE typically performs PDSCH decoding based on the target TP information after the TP has been changed. For example, the PDSCH or ePDCCH configuration is the same but CRS resource element (RE) position is changed with a new TP because the CRS is cell specific and the position may be different in each cell. Therefore, REs available for PDSCH REs can be changed based on the CRS RE position of the new TP because the PDSCH or the ePDCCH are transmitted in the remaining REs which are not used for CRS. If the CRS is not transmitted in the serving cell, such as in a new carrier type disclosed in the 3GPP LTE Rel-11 specification, this operation is not required.

With regards to uplink synchronization, the receiving point (RP) may be changed along with the TP. If the RP is changed, the UE can be synchronized to the target RP. If the target RP already receives the uplink channels from the UE before the TP change happens then uplink synchronization may not required. For instance, sending a time alignment command from the UE to the new RP may be sufficient to synchronize the UE with the RP for communicating data in the uplink. If the timing in the UL transmission from the UE to the new RP is off by an amount that is greater than the time alignment command can handle then the UE can be configured to send a physical random access channel (PRACH) preamble for uplink synchronization. Until the random access procedure is completed, the UE can suspend the uplink transmission or the UE can transmit the uplink based on the timing of the serving cell. Alternatively, the timing advance value can be signaled without sending the PRACH preamble if the anchor serving cell or target RP knows the proper timing advance value. One example scenario for this approach is that the cell size of the target TP is so small that zero timing advance value is required.

If radio link monitoring and uplink power control are based on the CRS of the anchor serving cell, the UE is likely to experience a radio link failure and to use a high transmit power, as specified by the 3GPP LTE specification Rel. 10. To avoid this problem, the reference RS for radio link monitoring (RLM) and uplink power control can be changed to the CSI-RS of the target TP. If the UE knows CRS information associated with the target TP, the CRS of the target TP can be used for RLM and uplink power control.

With regards to downlink synchronization, if the UE is located within a target TP's coverage, it can be hard to receive CRS from the anchor serving cell due to interference. One possible problem is the poor CRS signal quality can degrade synchronization performance. When the TP changes, the UE can also change the synchronization reference with CSI-RS or CRS of the target TP.

If the RRC layer is still in the anchor serving cell, the UE may still need to receive master information block (MIB) and system information block (SIB) information from the anchor serving cell only. In this case, the UE can receive MIB/SIB updated information with dedicated RRC signaling. In another embodiment, if the RRC layer is moved to a non-anchor cell of a target TP, the UE can receive the MIB/SIB information of the target TP. When the RRC layer is moved to the non-anchor cell of the target TP then the UE can receive the MIB/SIB information of the target TP directly or the target TP can send the MIB/SIB information to the UE by using dedicated RRC signaling.

The anchor serving cell can be configured to typically connect the UE with the best DL and UL cell. In the TP change flow illustrated in FIG. 3, it is assumed that the best downlink cell and the best uplink cell are located at the same cell. Therefore, the TP and RP can typically be associated with the same cell. However, it is also possible that a TP and an RP are associated with different cells. In this case, the TP and RP changes are triggered to the different non-anchor cells and the UE is signaled with a TP change and an RP change indication separately. The process, however, remains similar to the flow illustrated in FIG. 3 and described in the preceding paragraphs, as can be appreciated.

When a UE moves from a non-anchor cell (source TP) to an anchor serving cell (target TP) to produce a TP change, the process illustrated in FIG. 3, in which the UE moves from an anchor serving cell to a non-anchor cell, can still be performed. However, when moving from a non-anchor cell to an anchor serving cell, if an RRC layer connection of the UE is still in the anchor serving cell then the measurement control/TP change decision can be made in the anchor serving cell. If the RRC layer connection of the UE is in the non-anchor cell of the source TP, the measurement control/TP change can be performed by the non-anchor cell of the source TP. When a TP change from the non-anchor cell to the anchor serving cell occurs, an existing U-plane and C-plane tunnel can be released after the TP change is completed. This will be discussed more fully in the proceeding paragraphs.

Figure 4:
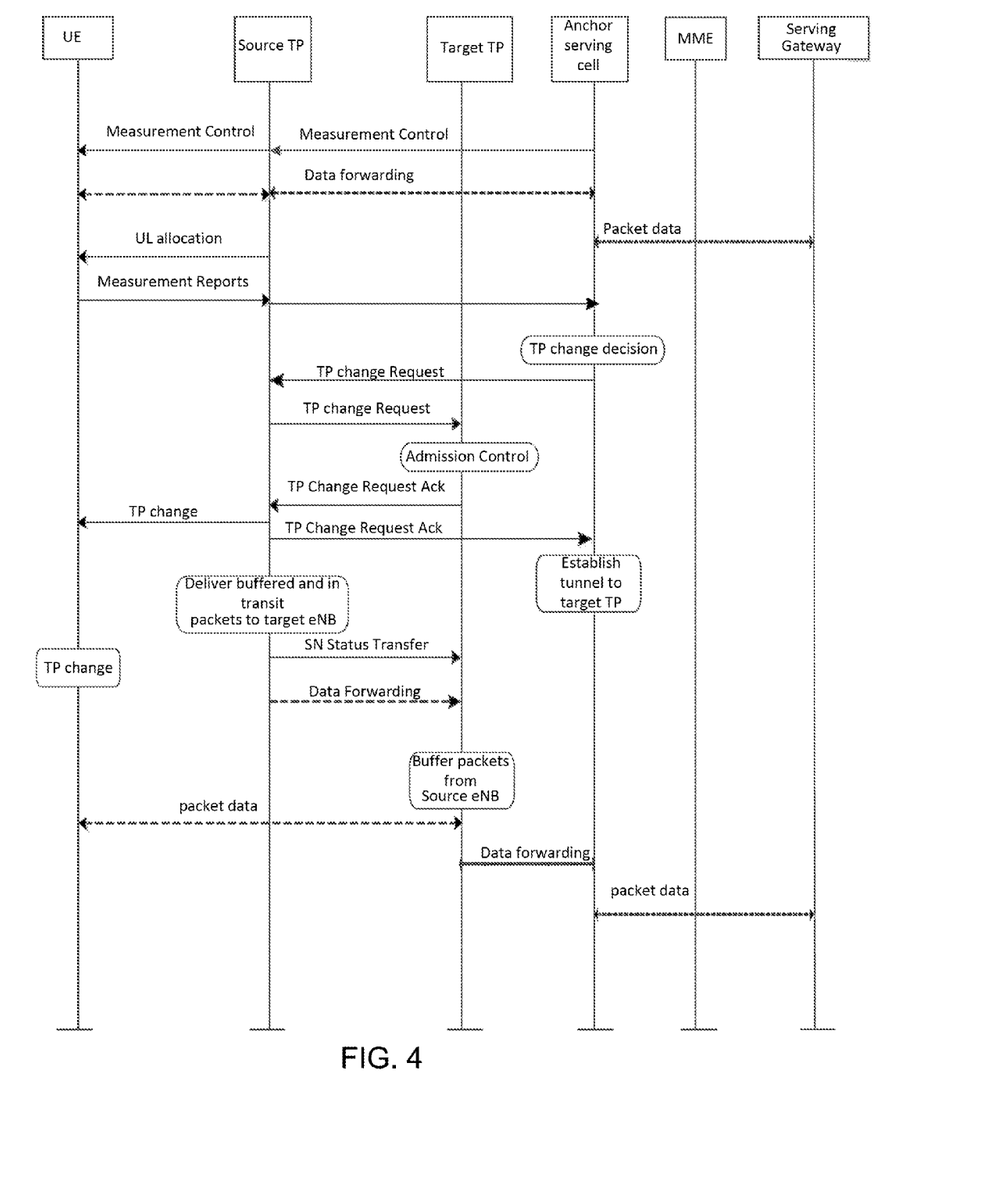
FIG. 4 illustrates an additional flow diagram of a change in transmission point for a UE in accordance with another example.

FIG. 4 provides an example illustration of a TP change flow when a source TP is not located in the anchor serving cell. When this occurs, measurement control can be configured by the anchor serving cell and transmitted through the source TP, as shown in FIG. 4. After the anchor serving cell receives measurement reports, the anchor serving cell can determine whether a TP change is desired based on the received measurements, such as CSI-RS based RRM reports, Reference Signal Received Power (RSRP) measurements, Reference Signal Received Quality (RSRQ) measurements, and so forth.

If the TP is changed, the anchor serving cell can transmit a TP change request to a source TP. In the TP change request, the anchor serving cell can indicate the target TP. The TP change request is then sent from the anchor serving cell to the source TP. The source TP then forwards the TP change request to the target TP. It is also possible for the anchor serving cell to send the TP change request to both the source TP and the target TP. Once the TP change request is sent to the source TP and the target TP, the remaining TP change procedure is substantially the same as illustrated in FIG. 3, and discussed in the preceding paragraphs.

In the flow illustrated in FIG. 4, it is assumed that the RRC layer is located in the anchor serving cell. If the RRC layer is located in the source TP, the measurement control, TP change decision and TP change request can be made by the source TP.

In either of the flows illustrated in FIG. 3 and FIG. 4, the ability for a UE to move from one TP to another TP while maintaining an RRC connection can be applied when macro cells and small cells are deployed in the same frequency layer or when macro cells low power nodes are deployed in different frequency layers. In the latter case, the TP change indication can be sent by the anchor eNB containing the source TP so that UE knows ahead of time when to switch the radio frequency signal to the frequency of the target TP. An implicit or explicit action time for the switch to the target TP after receiving the TP change indication from the source TP may be used.

Embodiments of this invention can also be applied when carrier aggregation is used. For example, carrier aggregation may be used when a macro cell and a low power node both deploy carriers f1 and f2. The primary serving cell (Pcell) of the UE corresponds to one of the carriers f1 or f2 of the anchor macro eNB. The secondary serving cell (Scell) of the UE corresponds to the other carrier of the anchor macro eNB.

Embodiments of this invention can also be applied when a macro cell and low power node both deploy carriers f1 and f2, while only the low power node deploys carrier f2. In this embodiment, the primary serving cell (Pcell) of the UE corresponds to one of the carriers f1 and f2 of the anchor macro eNB. The secondary serving cell (Scell) of the UE corresponds to the other of the carriers f1 and f2 of the low power node, which can be designated as the TP of the UE.

Network Architecture

Figure 5A:
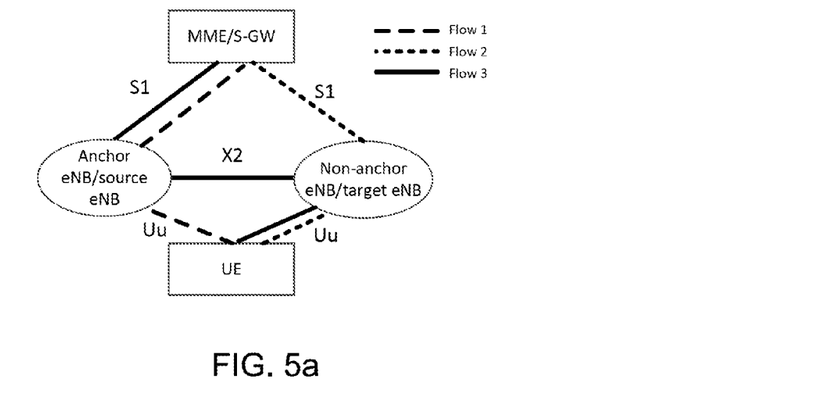
FIG. 5a illustrates a block diagram of an example network architecture to provide a change in transmission point for a UE in accordance with an example.

In a typical 3GPP LTE system based on Rel. 8, 9, or 10, when a handover is completed, the S-GW is configured to switch the downlink data paths to the target cell and releases data path to the serving cell. For example, as shown in FIG. 5a, when the UE is located in the anchor/source cell's coverage, the UE is connected to the MME/S-GW through the source cell (marked as flow 1). If the UE is handed over to the non-anchor/target cell, the UE is connected to the MME/S-GW through the target cell (marked as flow 2).

However, in order to perform a TP change without terminating a connection between a UE and the MME/SGW via the source eNB, a new type of architecture may be used. In accordance with one embodiment of the present invention, a connection of a UE to the anchor/source eNB can be maintained even if the UE enters the coverage of the non-anchor/target eNB, with its associated TP. The UE can be connected to the MME/S-GW through the anchor/source eNB while the air resource connection of the UE is served by the non-anchor/target eNB, as illustrated in FIG. 5a by flow 3.

When an uplink connection is formed, the non-anchor/target eNB forwards the received uplink data to the anchor/source eNB via an X2 interface and the anchor/source eNB delivers the data to the S-GW. For downlink, the anchor/source eNB is configured to deliver data packet to the target TP via the X2 interface.

When a TP change request is sent from the anchor/source eNB to the non-anchor/target eNB hosting the selected TP, U-plane tunnels can be established between the anchor serving cell and the target TP. One U-plane tunnel for uplink data forwarding and another one for downlink data forwarding for each data radio bearer (DRB). Unlike a typical handover procedure, this U-plane tunnel is used for the target TP to send the uplink data and used for the anchor serving cell to send the downlink data to the target TP after the TP changes. In addition, a C-plane tunnel is also established to forward C-plane data for each signaling radio bearer (SRB) for uplink and for downlink separately between the anchor/source eNB and the non-anchor/target eNB.

Figure 5B:
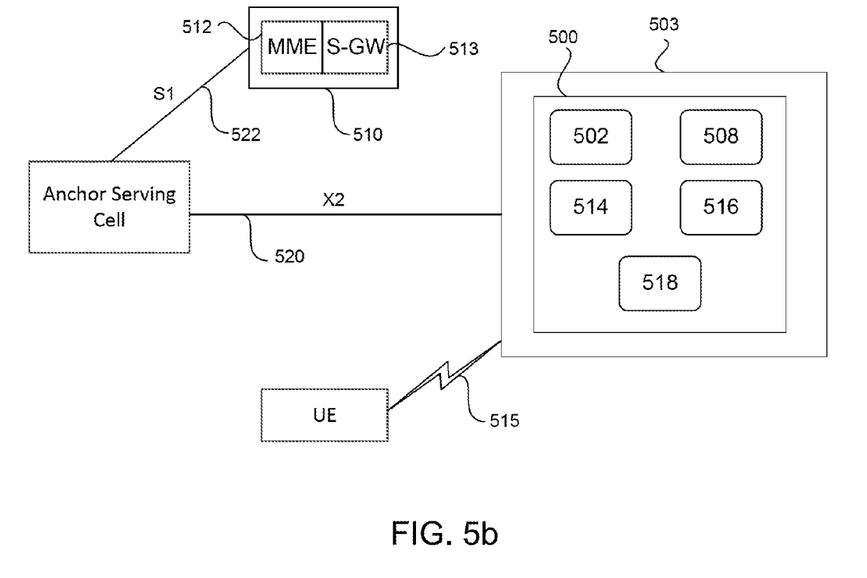
FIG. 5b illustrates a block diagram of a heterogeneous network handover device operating in the network architecture of FIG. 5a in accordance with an example.

FIG. 5b illustrates a block diagram of a heterogeneous network (HetNet) handover device 500 in a target transmission point 503. The target transmission point can reside in the non-anchor eNB/target eNB of FIG. 5a. The device can comprise a transmission point (TP) change module 502 configured to receive a TP change request from an anchor serving cell 504 for a user equipment (UE) 506. The anchor serving cell is synonymous with the anchor eNB/source eNB of FIG. 5a.

The device 500 can further comprise a downlink data forwarding module 508 configured to receive downlink information from the anchor serving cell 504 that is sent from a core network (CN) 510. In one embodiment, the core network can comprise an evolved packet core (EPC) that includes a mobile management entity (MME) and a serving gateway (S-GW) 512.

The device 500 can also include an air interface module 514 configured to send the downlink information to the UE 506 and receive uplink information from the UE via an air interface 515 between the UE and the target cell. The device can also include an uplink forwarding module 516 configured to send the uplink information to the anchor serving cell 504 for communication to the CN 510 to enable the UE to communicate with the CN via the target TP.

The HetNet handover device 500 can further comprise a buffer module 518 configured to buffer packets sent from the anchor serving cell to the target cell. The buffer module is an intermediate phase which typically occurs before the target TP sends downlink data to the UE.

In one embodiment, the downlink data forwarding module 508 is further configured to receive the downlink information from the anchor serving cell 504 via an X2 interface 520. The downlink information can be sent from at least one of the mobile management entity (MME) 512 and a serving gateway (S-GW) 513 to the anchor serving cell via an S1 connection 522.

Protocol Architecture

Figures 6A, 6B:
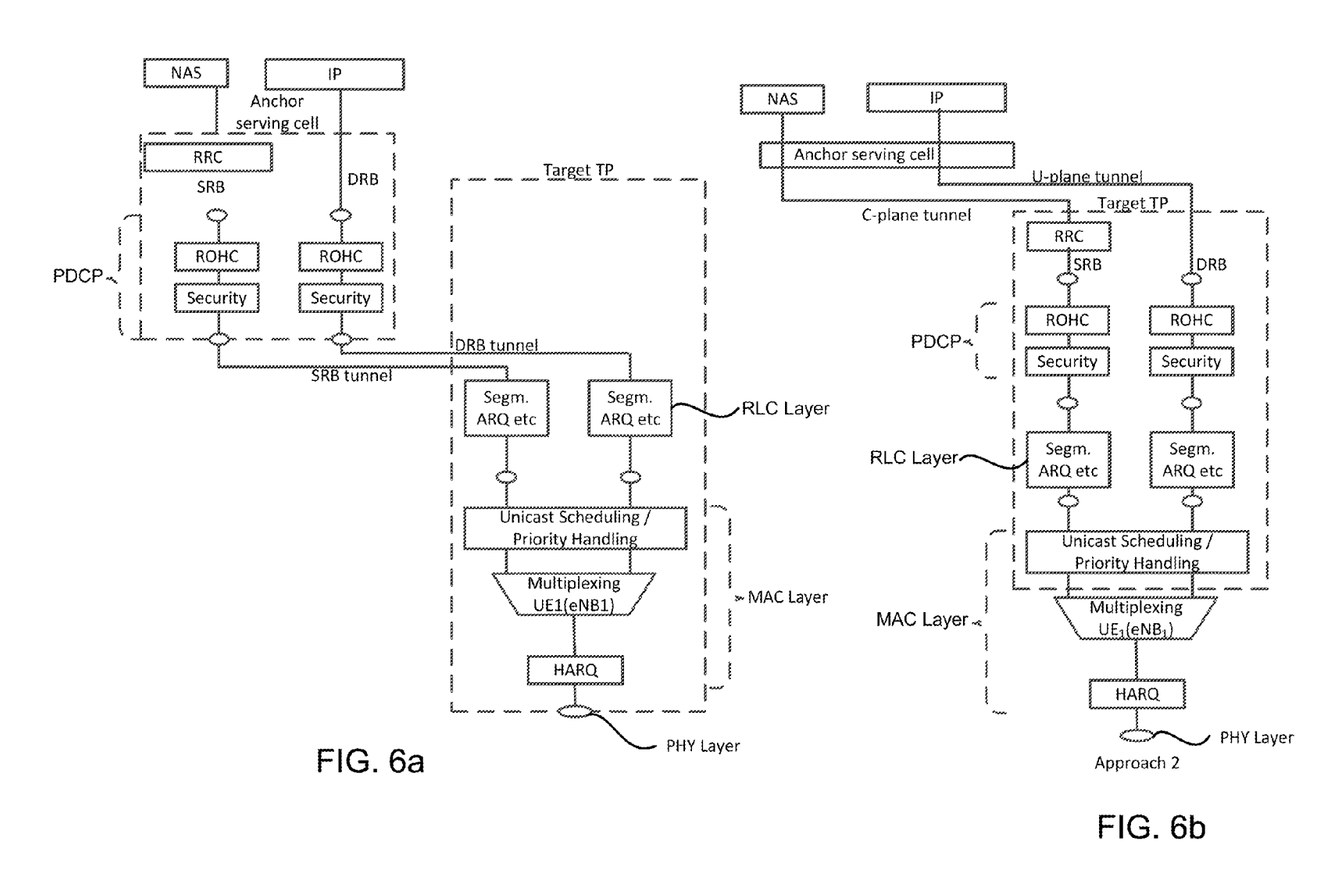
FIG. 6a illustrates a block diagram of a protocol architecture to provide a change in transmission point for a UE in accordance with an example.
FIG. 6b illustrates a block diagram of an additional protocol architecture to provide a change in transmission point for a UE in accordance with an example.

FIGS. 6a and 6b provide three examples of a protocol that can be used to enable a wireless system configured to communicate via the 3GPP LTE specification to provide the TP change operation discussed in the preceding paragraphs. In one embodiment, the S1 path through the anchor serving cell may be maintained regardless of the TP change. This can allow more frequent and flexible TP changes.

In a first example embodiment, illustrated in FIG. 6a, the anchor serving cell can be configured to host a packet data convergence protocol (PDCP) and an RRC layer. The control plane can include the RRC layer, which can provide communication from a non-access stratum (NAS), with the RRC communication carried by a signaling radio bearer (SRB). A user data plane can communicate IP packets via a data radio bearer (DRB) in the anchor serving cell. The data can be compressed using ROHC and have security applied, as illustrated in FIG. 6a. To forward a PDCP protocol data unit (PDU) between the Anchor eNB containing the source TP and the non-anchor eNB containing the target TP, a tunnel is established for each radio bearer. For example, an SRB tunnel and a DRB tunnel can be formed between the anchor serving cell and the target TP to carry the control data and user data, respectively, as PDCP PDUs in this example.

The target TP can include a radio link control (RLC) layer to receive the information via the SRB tunnel and DRB tunnel. A MAC and physical (PHY) layer can also be located in the target TP. Since security function is still in the anchor serving cell, it is not necessary to change a security key and maintain encryption.

Another embodiment is illustrated in FIG. 5b. In this example, all Access Stratum (AS) protocols are located in the non-anchor eNB containing the target TP. The S1 control and data paths are connected through the anchor eNB containing the source TP. To support it, a control plane (C-plane) tunnel and a user plane (U-plane) tunnel are established for each radio bearer. Since the security function is located in the target TP, the security key may need to be newly derived based on the target TP information as supported in handover. Alternatively, the anchor serving cell can pass the security key related parameters to the target TP so that the target TP can simply use the serving cell parameters to derive the security key.

In another embodiment, a different approach can be applied for DRB and for SRB. For instance, for DRB, approach 1 may be applied, while for SRB, approach 2 may be applied. Alternatively, the opposite configuration is also possible, with approach 1 applied for SRB and approach 2 applied for DRB.

In another example, when the UE camps on the pico cell in the idle mode and thus, an RRC connection is established with the pico cell in the connected mode for the actual call, three example approaches are provided that can be used to avoid a frequent handover. In a first approach, the pico cell can be designated as the anchor serving cell if the UE performs an RRC connection establishment with the pico cell. In this case, a TP change, as previously discussed, can be applied with the pico cell operating as the anchor eNB.

In another approach, a macro cell that the pico cell is overlaid on can always be designated as the anchor serving cell of the UE. When the UE performs an RRC connection establishment at a pico cell, the pico cell can configure the radio resource configuration and security key related parameters of the UE that correspond to those of the anchor macro cell. The pico cell can request the macro-cell to establish the connection to the MME/S-GW through the macro cell. When the macro cell establishes an S1 connection for this UE, the macro cell can provide the radio resource configuration and security key related parameters for this UE. The C-plane and U-plane tunnels can be established between the anchor macro cell and the pico cell, as illustrated in FIG. 6b. Alternatively, the UE can avoid camping on the pico-cell during cell selection/reception.

In a third approach, after an RRC connection establishment, the pico cell can be designated as the anchor serving cell of the UE. The pico cell can be configured to perform a 'pseudo handover' of the UE to the macro cell. The macro cell then becomes the anchor serving cell. However, the pico cell can remain as the source TP of the UE.

Figure 7:
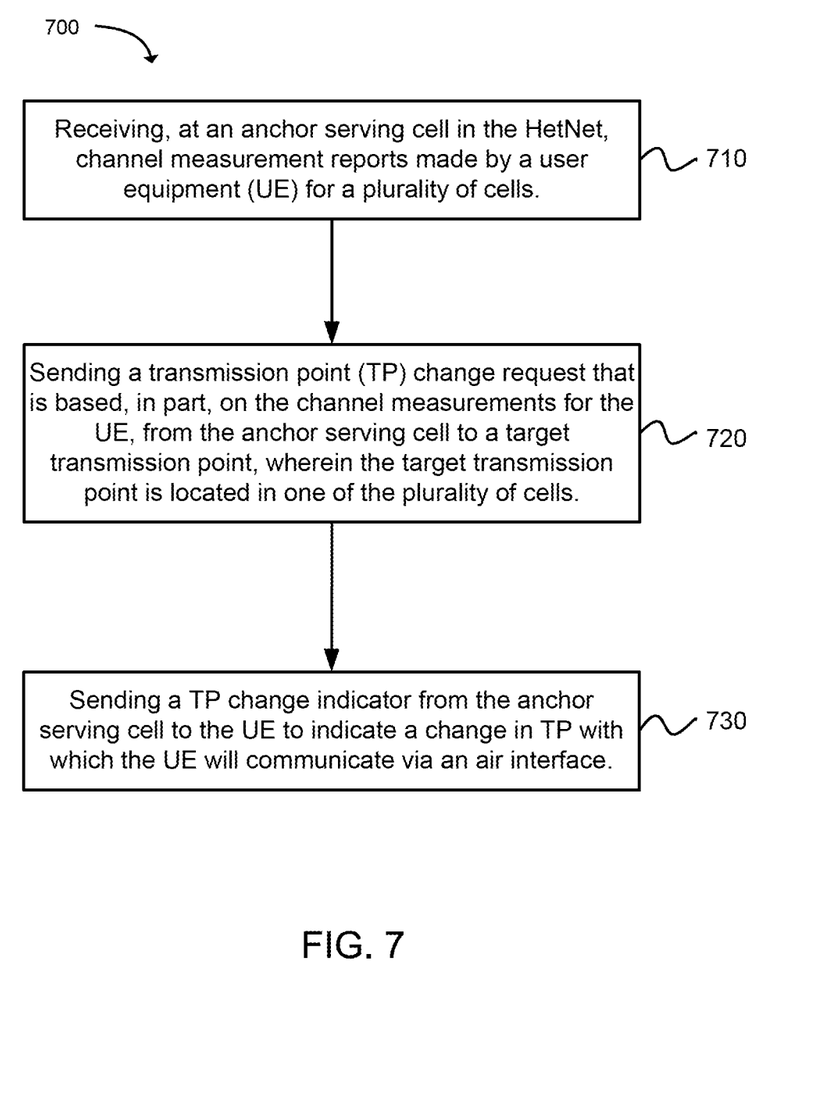
FIG. 7 depicts a flow chart of a method for performing a handover in a heterogeneous wireless network (HetNet) in accordance with an example.

In another embodiment, a method 700 for performing a handover in a heterogeneous wireless network (HetNet) is disclosed, as depicted in the flow chart of FIG. 7. The method includes the operation of receiving, at an anchor serving cell in the HetNet, channel measurement reports made by a user equipment (UE) for a plurality of cells, as shown in block 710. The plurality of cells can include at least one macro cell and at least one low power node.

An additional operation of the method 700 includes sending a transmission point (TP) change request that is based, in part, on the channel measurements for the UE, from the anchor serving cell to a target transmission point, wherein the target transmission point is located in one of the plurality of cells, as shown in block 720. Information in addition to the channel measurement s can also be used to identify a transmission point that will be communicated in the TP change request. A further operation comprises sending a TP change indicator from the anchor serving cell to the UE to indicate a change in TP with which the UE will communicate via an air interface, as shown in block 730.

The method 700 further comprises receiving uplink packets, from the UE, at the anchor serving cell via the target TP. The uplink packets can be sent from the UE to the target TP via the air interface and forwarded from the target TP to the anchor serving cell. The downlink packets can then be sent from the anchor serving cell to the target TP for transmission to the UE via the air interface.

The operation of receiving channel measurements can further comprise receiving the channel measurements made by the UE using channel state information reference signals (CSI-RS) to enable handover to occur for the UE from the anchor serving cell to the target TP while continuing to use a radio resource control (RRC) layer configured by the anchor serving cell.

The method 700 can additionally include sending the TP change indicator from the anchor serving cell to the UE using one of downlink control information (DCI), radio resource control (RRC) signaling, and a medium access control (MAC) control element (CE); and receiving radio link monitoring information and uplink power control information at the anchor serving cell based on channel state information (CSI) reference signals (RS) information measured in an air interface between the UE and the TP target.

The method 700 can also include sending at least one of a master information block (MIB) and a system information block (SIB) from the anchor serving cell to the UE via the target TP. For example, the MIB/SIB information can be sent from an anchor cell via an X2 connection to the target TP. If the RRC layer is located in the target TP, the UE can receive the target TP's MIB/SIB from the target TP directly.

In one embodiment, the UE can change from a source TP to a target TP by: receiving, at the anchor serving cell in the HetNet, channel measurement reports made by the user equipment (UE) for the plurality of cells; identifying that a change in TP is to be performed based on the channel measurement reports; and sending a TP change request from the anchor serving cell to a source TP that indicates the target TP to enable the source TP to forward the TP change request to the target TP.

The method 700 can additionally include forming an uplink/downlink data path to the anchor serving cell by: forming an s1 data connection between the anchor serving cell and at least one of a mobile management entity (MME) and a serving gateway (S-GW); and forming an X2 interface between the anchor serving cell and the target TP to enable data communication between one of the MME and the S-GW with the UE via the target TP, wherein the target TP has a Uu connection with the UE.

The method 700 also can include forming, a U-plane tunnel between the anchor serving cell and the target TP to enable uplink data forwarding and downlink data forwarding between the anchor serving cell and the target TP. A c-plane tunnel can be formed between the anchor serving cell and the target TP to enable signaling radio bearer (SRB) communication for a downlink and an uplink between the anchor serving cell and the target cell.

Figure 8:
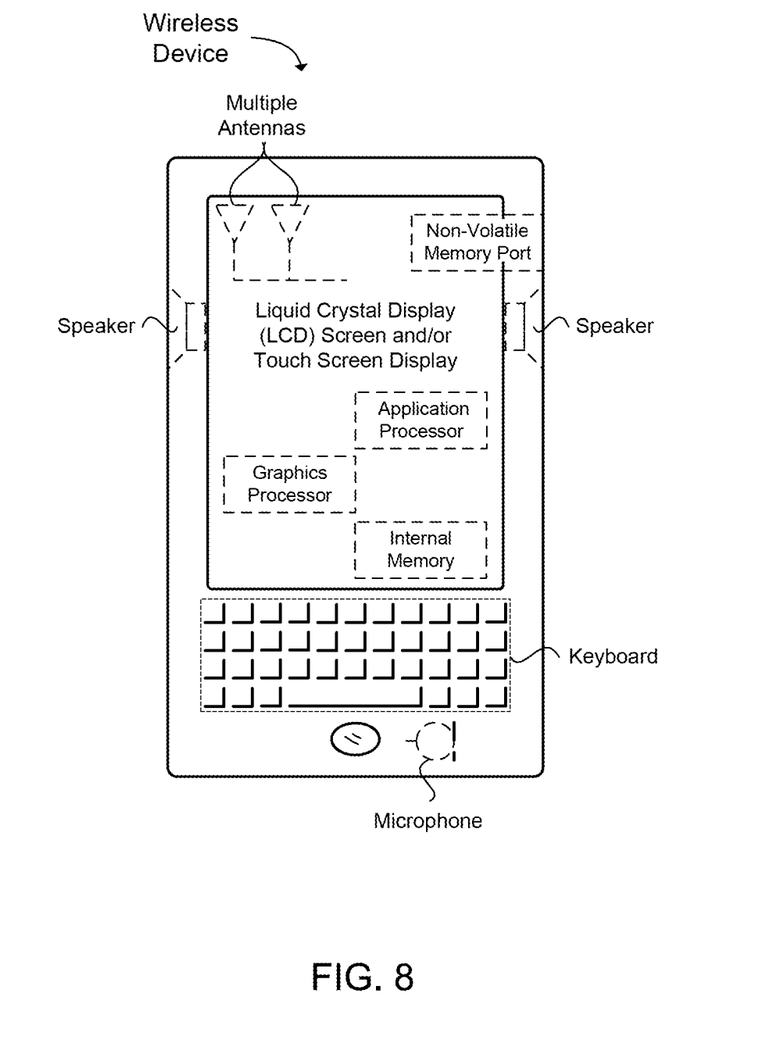
FIG. 8 illustrates a diagram of a wireless device (e.g., UE) in accordance with an example.

FIG. 8 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

In one embodiment, the UE can be operable to perform a handover in a heterogeneous wireless network (HetNet). The UE can have circuitry configured to: receive a transmission point change indicator at the UE from an anchor serving cell indicating a target transmission point (TP) for an air interface with the UE; sending uplink data from the UE to the target TP to enable the target TP to forward the uplink data to the anchor serving cell for communication to a core network; and receiving downlink data at the UE from the target TP, wherein the downlink data is sent from the core network to the TP via the anchor serving cell.

The circuitry of the UE can be further configured to receive the transmission point change indicator at the UE using one of downlink control information (DCI), radio resource control (RRC) signaling, and a medium access control (MAC) control element (CE); identify carrier-specific resource signal (CRS) resource element (RE) position for the target TP, when CRS is transmitted by the target TP; and perform physical downlink shared channel (PDSCH) decoding based on information in the CRS.

The circuitry of the UE may also be configured to send a physical random access channel (PRACH) preamble to the target TP to perform uplink synchronization with the target TP when the target TP includes a different receiving point (RP) than the anchor serving cell. The circuitry can also be configured to perform radio link monitoring and uplink power control using a channel state information reference signal (CSI-RS) of the target TP; and change a synchronization reference using the CSI-RS of the target TP.

The UE can also have circuitry that is configured to send channel measurements made by the UE using channel state information reference signals (CSI-RS) to enable handover to occur for the UE from the anchor serving cell to the target TP while continuing to use a radio resource control (RRC) layer configured by the anchor serving cell.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for performing a handover in a heterogeneous wireless network (HetNet), comprising:

receiving, at an anchor serving cell in the HetNet, channel measurement reports made by a user equipment (UE) for a plurality of cells, wherein one or more of the channel measurement reports is initialized using one or more UE-specific Radio-Resource-Control-configured parameters instead of one or more cell-specific parameters that use a physical cell ID of a specific cell, to enable the UE to avoid performing Radio-Resource reconfiguration when a change in transmission point (TP) from the anchor serving cell to a target TP has occurred;

sending a TP change request that is based, in part, on the channel measurements for the UE, from the anchor serving cell to the target TP, wherein the target TP is located in one of the plurality of cells; and sending a TP change indicator from the anchor serving cell to the UE to indicate the change in TP with which the UE will communicate via an air interface.

2. The method of claim 1, further comprising:

receiving uplink packets, from the UE, at the anchor serving cell via the target TP, wherein the uplink packets are sent from the UE to the target TP via the air interface and forwarded from the target TP to the anchor serving cell; and sending downlink packets from the anchor serving cell to the target TP for transmission to the UE via the air interface.

3. The method of claim 1, wherein receiving channel measurements further comprises receiving the channel measurements made by the UE using the one or more UE-specific RRC-configured parameters to initialize channel state information reference signals (CSI-RS) to enable handover to occur for the UE from the anchor serving cell to the target TP without requiring Radio Resource reconfiguration to be performed when the change in TP from the anchor serving cell to the target TP has occurred.

4. The method of claim 1, further comprising sending the TP change indicator from the anchor serving cell to the UE using one of downlink control information (DCI), radio resource control (RRC) signaling, and a medium access control (MAC) control element (CE).

5. The method of claim 1, further comprising sending at least one of a master information block (MIB) and a system information block (SIB) from the anchor serving cell to the UE via the target TP.

6. The method of claim 1, further comprising sending at least one of a master information block (MIB) and a system information block (SIB) from the target TP to the UE using a radio resource control (RRC) layer signaling.

7. The method of claim 1, further comprising changing from a source TP to a target TP, comprising:

receiving, at the anchor serving cell in the HetNet, channel measurement reports made by the user equipment (UE) for the plurality of cells;

identifying that a change in TP is to be performed based, in part, on the channel measurement reports; and sending a TP change request from the anchor serving cell to a source TP that indicates the target TP to enable the source TP to forward the TP change request to the target TP.

8. The method of claim 1, further comprising forming an uplink/downlink data path to the anchor serving cell comprising:

forming an s1 data connection between the anchor serving cell and at least one of a mobile management entity (MME) and a serving gateway (S-GW); and forming an X2 interface between the anchor serving cell and the target TP to enable data communication between one of the MME and the S-GW with the UE via the target TP, wherein the target TP has a Uu connection with the UE.

9. The method of claim 8, further comprising:
forming a U-plane tunnel between the anchor serving cell and the target TP to enable uplink data forwarding and downlink data forwarding between the anchor serving cell and the target TP; and
forming a c-plane tunnel between the anchor serving cell and the target TP to enable signaling radio bearer (SRB) communication for a downlink and an uplink between the anchor serving cell and the target cell.

10. A user equipment (UE) operable to perform a handover in a heterogeneous wireless network (HetNet), having computer circuitry configured to:
communicate using one or more physical channels of the UE configured to be initialized using one or more UE-Specific Radio-Resource-control-configured parameters, wherein the one or more UE-Specific Radio-Resource-control-configured parameters are used instead of one or more cell-specific parameters that use a physical cell ID of a specific cell to enable the UE to avoid performing Radio-Resource reconfiguration when a change in transmission point (TP) from an anchor serving cell to a target TP has occurred;
receive a TP change indicator at the UE from the anchor serving cell indicating the target TP for an air interface with the UE;
send uplink data from the UE to the target TP using the one or more physical channels to enable the target TP to forward the uplink data to the anchor serving cell for communication to a core network; and
receive downlink data at the UE from the target TP without having to perform radio resource reconfiguration when the change in TP from the anchor serving cell to the target TP has occurred, wherein the downlink data is sent from the core network to the TP via the anchor serving cell.

11. The computer circuitry of claim 10, having circuitry further configured to:
receive the transmission point change indicator at the UE using one of downlink control information (DCI), radio resource control (RRC) signaling, and a medium access control (MAC) control element (CE).

12. The computer circuitry of claim 10, having circuitry further configured to:
identify carrier-specific resource signal (CRS) resource element (RE) position for the target TP, when CRS is associated with the target TP; and
receiving physical downlink shared channel (PDSCH) resource elements not used for the CRS resource elements (Res).

13. The computer circuitry of claim 10, having circuitry further configured to perform radio link monitoring and uplink power control based on channel state information (CSI) reference signal (RS) information corresponding to the target TP.

14. The computer circuitry of claim 10, having circuitry further configured to send a physical random access channel (PRACH) preamble to the target TP to perform uplink synchronization with the target TP when the target TP includes a different receiving point (RP) than the anchor serving cell.

15. The computer circuitry of claim 10, having circuitry further configured to perform radio link monitoring and uplink power control using a channel state information reference signal (CSI-RS) of the target TP.

16. The computer circuitry of claim 15, having circuitry further configured to change a synchronization reference using the CSI-RS of the target TP.

17. The computer circuitry of claim 10, having circuitry further configured to send channel measurements made by the UE using channel state information reference signals (CSI-RS) to enable handover to occur for the UE from the anchor serving cell to the target TP while continuing to use a radio resource control (RRC) layer configured by the anchor serving cell.

18. The computer circuitry of claim 10, wherein the UE includes at least one of an antenna, a touch sensitive display screen, a speaker, a microphone, a graphics processor, an application processor, internal memory, a non-volatile memory port, and combinations thereof.

19. A heterogeneous network (HetNet) handover device in a target transmission point (TP), comprising:
a TP change module configured to receive a TP change request from an anchor serving cell for a user equipment (UE), wherein the UE is configured to communicate using one or more physical channels of the UE, and wherein the physical channels of the UE are configured to be initialized using one or more UE-Specific Radio-Resource-control-configured parameters instead of one or more cell-specific parameters that use a physical cell ID of a specific cell to enable the UE to avoid performing radio resource reconfiguration when a change in TP from the anchor serving cell to the target TP has occurred;
a downlink data forwarding module configured to receive downlink information from the anchor serving cell that is sent from a core network (CN);
an air interface module configured to send the downlink information to the UE and receive uplink information from the UE using the one or more physical channels via an air interface between the UE and the target TP;
an uplink forwarding module configured to send the uplink information to the anchor serving cell for communication to the CN to enable the UE to communicate with the CN via the target TP without having to perform radio resource reconfiguration when the change in TP from the anchor serving cell to the target TP has occurred.

20. The HetNet handover device of claim 19, further comprising a buffer module configured to buffer packets from the anchor serving cell.

21. The HetNet handover device of claim 19, wherein the downlink data forwarding module is further configured to receive the downlink information from the anchor serving cell via X2 interface.

22. The HetNet handover device of claim 19, wherein the downlink information is received from at least one of a mobile management entity (MME) and a serving gateway (S-GW) to the anchor serving cell via an S1 connection.

23. The UE of claim 10, wherein the one or more physical channels of the UE configured to be initialized using one or more UE-Specific Radio-Resource-control-configured parameters include one or more of: a physical downlink shared channel (PDSCH), an enhanced physical downlink control channel (E-PDCCH), a physical uplink shared channel (PUSCH), a physical uplink control channel (PUCCH), or a sounding reference signal (SRS).

24. The HetNet handover device of claim 19, wherein the one or more physical channels of the UE configured to be initialized using one or more UE-Specific Radio-Resource-control-configured parameters include one or more of: a physical downlink shared channel (PDSCH), an enhanced physical downlink control channel (E-PDCCH), a physical uplink shared channel (PUSCH), a physical uplink control channel (PUCCH), or a sounding reference signal (SRS).

* * * * *